United States Patent
Kousaka et al.

(10) Patent No.: US 12,139,573 B2
(45) Date of Patent: Nov. 12, 2024

(54) POLYMERIZABLE COMPOSITION FOR OPTICAL MEMBERS, OPTICAL MEMBER AND EYEGLASS LENS

(71) Applicant: HOYA LENS THAILAND LTD., Pathumthani (TH)

(72) Inventors: Masahisa Kousaka, Tokyo (JP); Yukio Kageyama, Tokyo (JP); Tomofumi Ohnishi, Tokyo (JP); Yoshio Sano, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 531 days.

(21) Appl. No.: 17/598,018

(22) PCT Filed: Mar. 27, 2020

(86) PCT No.: PCT/JP2020/014083
§ 371 (c)(1),
(2) Date: Sep. 24, 2021

(87) PCT Pub. No.: WO2020/196846
PCT Pub. Date: Oct. 1, 2020

(65) Prior Publication Data
US 2022/0169778 A1 Jun. 2, 2022

(30) Foreign Application Priority Data
Mar. 28, 2019 (JP) ................. 2019-063801

(51) Int. Cl.
C08G 18/38 (2006.01)
C08G 18/75 (2006.01)
C08G 18/76 (2006.01)
G02B 1/04 (2006.01)
G02C 7/02 (2006.01)

(52) U.S. Cl.
CPC ....... *C08G 18/3876* (2013.01); *C08G 18/757* (2013.01); *C08G 18/758* (2013.01); *C08G 18/7642* (2013.01); *G02B 1/041* (2013.01); *G02C 7/02* (2013.01)

(58) Field of Classification Search
CPC ............ C08G 18/3876; C08G 18/757; C08G 18/758; C08G 18/7642; G02B 1/041; G02C 7/02
See application file for complete search history.

(56) References Cited

U.S. PATENT DOCUMENTS

| | | |
|---|---|---|
| 5,578,658 A | 11/1996 | Sasagawa et al. |
| 5,736,609 A | 4/1998 | Irizato et al. |
| 6,130,307 A | 10/2000 | Amagai et al. |
| 2001/0030734 A1 | 10/2001 | Kosaka |
| 2004/0220370 A1 | 11/2004 | Kosaka |
| 2005/0062932 A1 | 3/2005 | Kosaka et al. |
| 2005/0131203 A1 | 6/2005 | Tanaka et al. |
| 2009/0259001 A1 | 10/2009 | Kousaka |
| 2013/0267673 A1 | 10/2013 | Takemura et al. |
| 2016/0355641 A1 | 12/2016 | Takemura et al. |
| 2017/0240683 A1 | 8/2017 | Iijima et al. |
| 2019/0062488 A1 | 2/2019 | Kageyama et al. |

FOREIGN PATENT DOCUMENTS

| | | |
|---|---|---|
| CN | 1148055 A | 4/1997 |
| CN | 1313513 A | 9/2001 |
| CN | 1578798 A | 2/2005 |
| CN | 1601306 A | 3/2005 |
| CN | 104203526 A | 12/2014 |
| CN | 106715502 A | 5/2017 |
| CN | 108779224 A | 11/2018 |
| EP | 2065415 A1 | 6/2009 |
| JP | H07-252207 A | 10/1995 |
| JP | H10-62601 A | 3/1998 |
| JP | 2001-330701 A | 11/2001 |
| JP | 2004-059901 A | 2/2004 |
| JP | 2006-131554 A | 5/2006 |
| JP | 2008-143872 A | 6/2008 |
| JP | 2018-016778 A | 2/2018 |
| KR | 10-2013-0085914 A | 7/2013 |
| WO | 2016/031975 A1 | 3/2016 |
| WO | 2016/153061 A1 | 9/2016 |

OTHER PUBLICATIONS

Jun. 16, 2020 International Search Report issued in International Patent Application No. PCT/JP2020/014083.
Apr. 7, 2023 Office Action issued in Chinese Patent Application No. 202080024519.7.

*Primary Examiner* — Rabon A Sergent
(74) *Attorney, Agent, or Firm* — Oliff PLC

(57) ABSTRACT

A polymerizable composition for optical components, which can prevent striae while keeping strength for optical components when a thick optical component is produced. A polymerizable composition for optical components is a mixture of a first composition including a polyisocyanate compound (A) and a second composition including a polythiol compound (B1) and a thiol group-containing substance (B2), the composition includes the thiol group-containing substance (B2) showing peak at a position at retention time three minutes or more from a peak of the polythiol compound (B1) in a chromatogram obtained by analyzing the composition by high performance liquid chromatography (HPLC) analysis, and the ratio (A/B1) is 80/100 to 95/100, wherein the equivalent ratio (A/B1) is an equivalent A of the polyisocyanate compound (A) using a weight and group number of the polyisocyanate compound (A) to B1 of the polythiol compound (B1) using a weight and group number of the polythiol compound (B1).

11 Claims, 1 Drawing Sheet

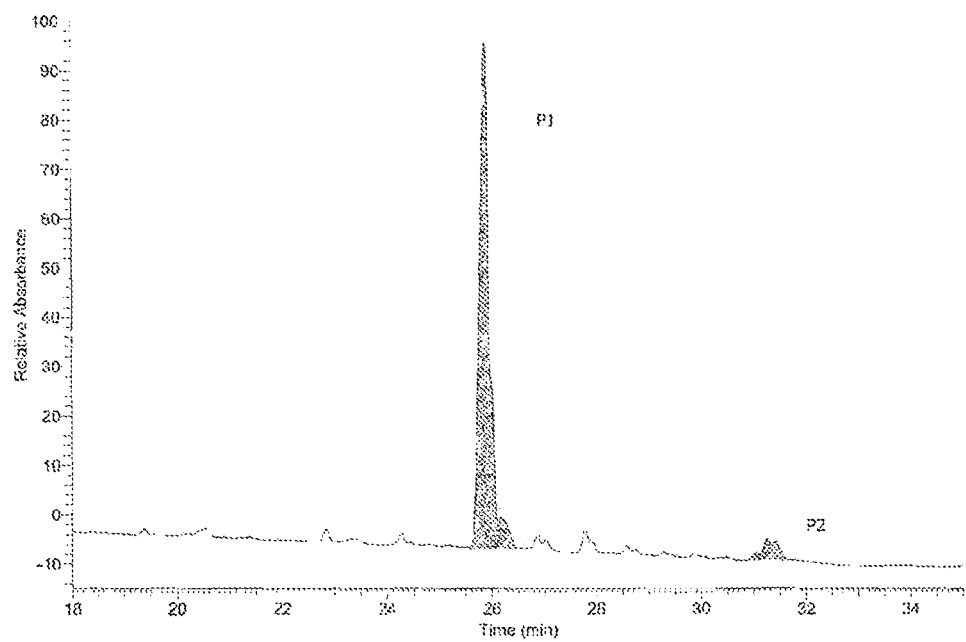

POLYMERIZABLE COMPOSITION FOR OPTICAL MEMBERS, OPTICAL MEMBER AND EYEGLASS LENS

TECHNICAL FIELD

The present disclosure relates to a polymerizable composition for optical components, an optical component, and a spectacle lens.

BACKGROUND ART

Plastic spectacle lenses are lightweight and excellent in impact durability as compared with glass spectacle lenses. For this reason, plastic spectacle lenses are mainstream in the current spectacle lens market.

It has been known that a plastic lens with a high refractive index can be obtained by a reaction of a polyisocyanate compound and a polythiol compound. For example, PTL 1 discloses a sulfur-containing urethane-based resin lens obtained by heating and curing a composition including a tetrathiol and at least one ester compound selected from the group consisting of a polyisocyanate compound, a polyisothiocyanate compound, and an isothiocyanate compound having an isocyanato group. This lens is colorless and transparent and has properties of high refractive index, low dispersion, and excellent heat resistance, and further shows excellent productivity.

CITATION LIST

Patent Literature

[PTL 1] Japanese Patent Application Publication No. H7-252207

SUMMARY OF INVENTION

Technical Problem

However, a plastic lens obtained by a reaction of a polyisocyanate compound and a polythiol compound can suffer from the occurrence of striae in some cases. For example, since crosslinking structures are formed in a lens disclosed in PTL 1 at low temperature due to the use of a tetrathiol, the viscosity rise during polymerization is rapid, and the striae tend to occur more easily than other urethane resin-based plastic lenses. If the occurrence of the striae is attempted to be suppressed by adjusting the type or component ratio of a polyisocyanate compound and a polythiol compound, another problem about other characteristics required for spectacle lenses, such as lower tensile strength, tends to occur. Thus, a polymerizable composition for optical components including a polyisocyanate compound and a polythiol compound is required to be further improved in view of the suppression of the occurrence of striae and the securement of other characteristics when a spectacle lens is produced.

Thus, an embodiment of the present disclosure relates to a polymerizable composition for optical components, which can prevent the occurrence of striae while keeping the required strength for optical components even when a thick optical component such as a semi-finish lens is produced.

Solution to Problem

A polymerizable composition for optical components of one embodiment of the present disclosure is
- a mixture of a first composition including the polyisocyanate compound (A) and a second composition including the polythiol compound (B1) and a thiol group-containing substance (B2),
- the polymerizable composition further includes the thiol group-containing substance (B2) showing a peak at a position corresponding to a retention time three minutes or more later from a position of a peak of the polythiol compound (B1) in a chromatogram obtained by analyzing the second composition by high performance liquid chromatography (HPLC) analysis under the following condition, and
- the polymerizable composition has an equivalent ratio (A/B1) of 80/100 to 95/100, wherein the equivalent ratio (A/B1) represents a ratio of an equivalent A of the polyisocyanate compound (A) calculated using a molecular weight and a functional group number of the polyisocyanate compound (A) to an equivalent B1 of the polythiol compound (B1) calculated using a molecular weight and a functional group number of the polythiol compound (B1).
  HPLC system: LC-30A, manufactured by Shimadzu Corporation
  column: YMC Triart C18 (3 to 150 mm, 3 μm)
  column temperature: 50° C.
  mobile phase: 0.1% aqueous formic acid solution (liquid A), acetonitrile (liquid B)
  gradient elution condition
  (1) flow rate: 0.3 mL/min
  (2) injection amount: 5 μL
  (3) detection wavelength: 230 nm

Advantageous Effects of Invention

According to the polymerizable composition for optical components of an embodiment of the present disclosure, a polymerizable composition for optical components capable of preventing the occurrence of striae while keeping the required strength for optical components even when a thick optical component is produced can be provided.

BRIEF DESCRIPTION OF DRAWINGS

FIG. 1 is a chromatogram of a second composition including the polythiol compound (B1) and a thiol group-containing substance (B2).

DESCRIPTION OF EMBODIMENTS

Each of the lower and upper limits steppedly described in preferred numerical ranges (for example, a range of content or the like) used herein may be independently combined. For example, from the statement "preferably 10 to 90, more preferably 30 to 60", a range of "10 to 60", which combines a "more preferred lower limit (10)" and "a more preferred upper limit (60)", may be adopted.

[Polymerizable Composition for Optical Components]

A polymerizable composition for optical components according to one embodiment of the present disclosure is a mixture of a first composition including a polyisocyanate compound (A) and a second composition including a polythiol compound (B1) and a thiol group-containing substance (B2) and includes the polyisocyanate compound (A) and the polythiol compound (B1). Furthermore, the polymerizable composition further includes the thiol group-containing substance (B2) showing a peak at a position corresponding to a retention time three minutes or more later from the position of a peak of the polythiol compound (B1) in a chromatogram obtained by analyzing the second composition by high performance liquid chromatography (HPLC) analysis under the following condition.

HPLC system: LC-30A, manufactured by Shimadzu Corporation
Column: YMC Triart C18 (3 to 150 mm, 3 μm)
Column temperature: 50° C.
Mobile phase: 0.1% aqueous formic acid solution (liquid A), acetonitrile (liquid B)
Gradient elution condition
(1) Flow rate: 0.3 mL/min
(2) Injection amount: 5 μL
(3) Detection wavelength: 230 nm Furthermore, the equivalent ratio (A/B1) represented by the ratio of the equivalent B1 of the polythiol compound (B1) calculated using the molecular weight and the functional group number of the polythiol compound (B1) is 80/100 to 95/100

According to the polymerizable composition for optical components of the above embodiment, a polymerizable composition for optical components capable of preventing the occurrence of striae while keeping the required strength for optical components even when a thick optical component such as a semi-finish spectacle lens is produced can be provided.

<Polyisocyanate Compound (A)>

Examples of the polyisocyanate compound (A) include a polyisocyanate compound having an aromatic ring, an alicyclic polyisocyanate compound, a linear or branched aliphatic polyisocyanate compound, and the like.

Examples of the polyisocyanate compound having an aromatic ring include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropyl phenylene diisocyanate, trimethylbenzene triisocyanate, benzene triisocyanate, biphenyl diisocyanate, toluidine diisocyanate, 4,4'-methylenebis(phenyl isocyanate), 4,4'-methylenebis(2-methylphenyl isocyanate), bibenzyl-4,4'-diisocyanate, bis(isocyanatophenyl)ethylene, bis(isocyanatomethyl)benzene, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methoxy-4-isocyanatophenyl) disulfide, bis(4-methoxy-3-isocyanatophenyl) disulfide, and the like.

Examples of the alicyclic polyisocyanate compound include diisocyanatocyclohexane, isophorone diisocyanate, bis(isocyanatomethyl)cyclohexane, dicyclohexylmethane diisocyanate, bis(isocyanatomethyl)bicycloheptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane, and the like.

Examples of the linear or branched aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-pentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octane diisocyanate, 1,2-diisothiocyanatoethane, and 1,6-diisothiocyanatohexane.

The polyisocyanate compound (A) may be used singly or in combination of two or more thereof.

The polyisocyanate compound (A) is preferably at least one selected from the group consisting of bis(isocyanatomethyl)benzene, isophorone diisocyanate, hexamethylene diisocyanate, bis(isocyanatomethyl)cyclohexane, dicyclohexylmethane diisocyanate, and bis(isocyanatomethyl)bicycloheptane, and more preferably at least one selected from the group consisting of bis(isocyanatomethyl)benzene, bis(isocyanatomethyl)cyclohexane, dicyclohexylmethane diisocyanate, and bis(isocyanatomethyl)bicycloheptane.

<Polythiol Compound (B1)>

Examples of the polythiol compound (B1) include an ester compound of a polyol compound and a mercapto group-containing carboxylic acid compound, a linear or branched aliphatic polythiol compound, a polythiol compound having an alicyclic structure, an aromatic polythiol compound, and the like.

In the ester compound of a polyol compound and a mercapto group-containing carboxylic acid compound, examples of the polyol compound include compounds having two or more hydroxyl groups in the molecule, such as ethylene glycol, diethylene glycol, propanediol, propanetriol, butanediol, trimethylolpropane, bis(2-hydroxyethyl) disulfide, pentaerythritol, dipentaerythritol, and the like.

Examples of the mercapto group-containing carboxylic acid compound include thioglycolic acid, mercaptopropionic acid, a thiolactic acid compound, thiosalicylic acid, and the like.

Examples of the ester compound of the polyol compound and the mercapto group-containing carboxylic acid compound include ethylene glycol bis(2-mercapto acetate), diethylene glycol bis(2-mercapto acetate), propanetriol tris(2-mercapto acetate), propanediol bis(2-mercapto acetate), butanediol bis(2-mercapto acetate), trimethylolpropane tris(2-mercapto acetate), trimethylolpropane tris(3-mercapto propionate), ethylene bis(hydroxy ethyl sulfide)bis(2-mercapto acetate), butanediol bis(2-mercapto acetate), butane diol bis(3-mercapto propionate), ethylene glycol bis(3-mercapto propionate), diethylene glycol bis(3-mercapto propionate), trimethylolpropane bis(3-mercapto propionate), pentaerythritol tetrakis(2-mercapto acetate), pentaerythritol tetrakis(3-mercapto propionate), dipentaerythritol hexakis(2-mercapto acetate), dipentaerythritol hexakis(3-mercapto propionate), or the like.

Examples of the linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethoxybutane-1,2-dithiol, 2,3-dimercapto-1-propanol, 1,2-dimercaptopropyl methyl ether, 2,3-dimercaptopropyl methyl ether, 2,2-bis(mercaptoethyl)-1,3-propanedithiol, bis(2-mercaptoethyl) ether, bis(2-mercaptoethyl) sulfide, bis(2-mercaptoethyl) disulfide, 4-mercaptomethyl-1,8-dimercapto-3,6-dithiaoctane, and bis(mercaptomethyl)-3,6,9-trithiaundecane dithiol.

Examples of the polythiol compound having an alicyclic structure include 1,1-cyclohexanedithiol, 1,2-cyclohexanedithiol, methylcyclohexanedithiol, bis(mercaptomethyl)cyclohexane, bis(mercaptomethyl)dithiane, and the like.

Examples of the aromatic polythiol compound include dimercaptobenzene, bis(mercaptomethyl)benzene, bis(mercaptoethyl)benzene, trimercaptobenzene, tris(mercaptomethyl)benzene, tris(mercaptoethyl)benzene, dimercaptobiphenyl, 4,4'-dimercaptobibenzyl, 2,5-toluenedithiol, naphthalenedithiol, 2,4-dimethylbenzene-1,3-dithiol, 4,5-dimethylbenzene-1,3-dithiol, 9,10-anthracene dimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, and the like.

These polythiol compounds may be used singly or in combination of two or more thereof.

The polythiol compound (B1) is preferably at least one selected from the group consisting of bis(mercaptomethyl)dithiane, pentaerythritol tetrakis(2-mercaptoacetate), pentaerythritol tetrakis(3-mercaptopropionate), 4-mercaptomethyl-1,8-dimercapto-3,6-dithiaoctane, bis(mercaptomethyl)-3,6,9-trithiaundecanedithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate), and more preferably at least selected from the group consisting of bis(mercaptomethyl)-3,6,9-trithiaundecanedithiol, bis(mercaptomethyl)dithiane, pentaerythritol tetrakis(2-mercaptoacetate), pentaerythritol tetrakis(3-mercaptopropionate), and 4-mercaptomethyl-1,8-dimercapto-3,6-dithiaoctane.

Further, bis(mercaptomethyl)-3,6,9-trithiaundecanedithiol is preferably a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

An embodiment of the polythiol compound (B1) includes a polythiol compound having two or more sulfide bonds and two or more mercapto groups.

An embodiment of the polythiol compound (B1) includes a polythiol compound having two or more sulfide bonds and three or more mercapto groups.

In addition, an embodiment of the polythiol compound (B1) is a mixture of plural kinds of polythiol compounds.

The polythiol compound (B1) is preferably selected from the following mixtures.

[1] A mixture of 2,5-bis(mercaptomethyl)-1,4-dithiane and pentaerythritol tetrakis(2-mercaptoacetate)

[2] A mixture of 4-mercaptomethyl-1,8-dimercapto-3,6-dithiaoctane and pentaerythritol tetrakis(3-mercaptopropionate)

[3]: A mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol Suitable examples of combinations of the polyisocyanate compound (A) and the polythiol compound (B1) include the following [1] to [3].

[1] 1,3-Bis(isocyanatomethyl)benzene and a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol

[2] 1,3-Bis(isocyanatomethyl)cyclohexane and a mixture of 2,5-bis(mercaptomethyl)-1,4-dithiane and pentaerythritol tetrakis(2-mercapto acetate)

[3] A mixture of 2,5-bis(isocyanatomethyl)-bicyclo[2.2.1]heptane and 2,6-bis(isocyanatomethyl)-bicyclo[2.2.1]heptane and a mixture of 4-mercaptomethyl-1,8-dimercapto-3,6-dithiaoctane and pentaerythritol tetrakis(3-mercapto propionate).

<Thiol Group-Containing Substance (B2)>

The thiol group-containing substance (B2) is a substance including a compound having at least a thiol group and shows a peak at a position corresponding to a retention time three minutes or more later from the position of a peak of the polythiol compound (B1) in a chromatogram obtained by analyzing the second composition including the polythiol compound (B1) and the thiol group-containing substance (B2) by high performance liquid chromatography (HPLC) analysis under the following condition.

HPLC system: LC-30A, manufactured by Shimadzu Corporation

Column: YMC Triart C18 (3 to 150 mm, 3 μm)

Column temperature: 50° C.

Mobile phase: 0.1% aqueous formic acid solution (liquid A), acetonitrile (liquid B)

Gradient elution condition (1) Flow rate: 0.3 mL/min (2) Injection amount: 5 μL (3) Detection wavelength: 230 nm Note that adverse effects such as the occurrence of striae can be prevented in an optical component produced by polymerizing the polymerizable composition for optical components by setting the equivalent ratio A/B1 to be within the above range even if the polymerizable composition for optical components includes a thiol group-containing substance (B2). Thus, limitations in preparing the second composition can be minimized.

FIG. 1 illustrates an example of a chromatogram obtained by the HPLC analysis of the second composition including the polythiol compound (B1) and the thiol group-containing substance (B2) under the above condition. The symbol P in FIG. 1 represents a peak derived from the polythiol compound (B1), and the symbol P2 in FIG. 1 represents a peal derived from the thiol group-containing substance (B2). For better understanding, the peak P1 and the peak P2 are lightly colored.

As illustrated in FIG. 1, the thiol group-containing substance (B2) shows a peak at a position corresponding to a retention time later from the position of the peak of the polythiol compound (B1), specifically at a position corresponding to a retention time three minutes or more later from the position of the peak of the polythiol compound (B1).

When the polythiol compound (B1) includes a single polythiol compound and a thiol group-containing substance (B2) as the compounds containing thiol groups, the peak having the maximum strength is derived from the polythiol compound (B1). Thus, the thiol group-containing substance (B2) shows a peak at a retention time three minutes or more later from the position of the peak of this peak having the maximum strength.

When the polythiol compound (B1) includes plural kinds of polythiol compounds and a thiol group-containing substance (B2) as the compounds containing thiol groups, and the plural kinds of polythiol compounds have similar structures, the peak having the maximum strength is derived from the polythiol compound (B1), as with the case where a single polythiol compound is included. When the similarity of the chemical structures of the plural kinds of polythiol compounds is low, a plurality of peaks with relatively high strength derived from the polythiol compound (B1) appear. Thus, the thiol group-containing substance (B2) shows a peak at a retention time three minutes or more later from the position of the peak with relatively high strength, appearing at a position corresponding to the latest retention time.

The thiol group-containing substance (B2) may show a peak at a position corresponding to a retention time from 31 to 32 minutes, as illustrated in the chromatogram of FIG. 1.

The thiol group-containing substance (B2) may include a polythiol compound having a structure in which a plurality of polythiol compounds (B1) are coupled.

The way for making the thiol group-containing substance (B2) exist in the polymerizable composition for optical components is not particularly restricted, and for example, adding a thiol group-containing substance showing a peak at a position corresponding to a retention time from 31 to 32 minutes in a chromatogram obtained under the condition mentioned above or a polythiol compound in which a plurality of polythiol compounds (B1) are coupled can make the thiol group-containing substance (B2) exist in the polymerizable composition for optical components.

Alternatively, the second composition including the polythiol compound (B1) and a substance generated as a by-product as the thiol group-containing substance (B2) is prepared while adjusting the reaction condition of the polythiol compound (B1) and the number or period of purifications after the reaction, followed by mixing the second composition with the first composition including the polyisocyanate compound (A), thereby making the thiol group-containing substance (B2) exist in the polymerizable composition for optical components.

<Equivalent Ratio of Polyisocyanate Compound (A) to Polythiol Compound (B1), and Thiol Group-Containing Substance (B2) Content>

The equivalent ratio (A/B1) represented by a ratio of an equivalent A of the polyisocyanate compound (A) calculated using the molecular weight and the functional group number of the polyisocyanate compound (A) to an equivalent B1 of the polythiol compound (B1) calculated using the molecular weight and the functional group number of the polythiol compound (B1) is 80/100 to 95/100, preferably 90/100 to 94/100, and more preferably 92/100 to 94/100. When the equivalent ratio of the polyisocyanate compound (A) to the polythiol compound (B1) is within the above range, optical components produced from the polymerizable composition for optical components show good heat resistance and striae suppression properties.

The total content of the polyisocyanate compound (A) and the polythiol compound (B1) is preferably 60% by mass or more and more preferably 80% by mass or more in relation to the total mass of the polymerizable composition for optical components.

The thiol group-containing substance (B2) content in the polymerizable composition for optical components is a mass such that the peak area derived from the thiol group-containing substance (B2) will be preferably 0.50 or less, more preferably 0.20 or less, further preferably 0.10 or less, assuming that the peak area derived from the polythiol compound (B1) is set to 100 in a chromatogram obtained by analyzing the second composition by high performance liquid chromatography (HPLC) analysis. When the polythiol compound (B2) content is within the above range, optical components produced from the polymerizable composition for optical components show good striae suppression properties.

<Other Components>

The polymerizable composition for optical components may include various additives such as an ultraviolet absorber, a polymerization catalyst, a release agent, an antioxidant, a coloring inhibitor, and a fluorescent whitening agent as an additional component.

(Ultraviolet Absorber)

The ultraviolet absorber preferably has a maximum absorption wavelength of 345 nm or larger in a chloroform solution.

Examples of the ultraviolet absorber include a benzophenone compound, a benzotriazole compound, dibenzoylmethane, 4-tert-butyl-4'-methoxybenzoylmethane, and the like.

Examples of the benzophenone compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, and the like.

Examples of the benzotriazole compound include 2-(2-hydroxy-5-methylphenyl)-2H-benzotriazole, 2-(2-hydroxy-3,5-di-tert-butylphenyl)-5-chloro-2H-benzotriazol e, 2-(2-hydroxy-3-tert-butyl-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-tert-octylphenyl)-2H-benzotriazole, 2-(2-hydroxy-4-octyloxyphenyl)-2H-benzotriazole, and the like.

These may be used singly or in combination of two or more thereof.

The amount of the ultraviolet absorber is preferably 0.01 part by mass or more, more preferably 0.05 parts by mass or more, further preferably 0.1 part by mass or more, further preferably 0.3 parts by mass or more, further preferably 0.5 parts by mass or more, and further preferably 0.8 parts by mass or more, and preferably 5 part by mass or less, more preferably 3 parts by mass or less, more preferably 2 parts by mass or less, and further preferably 1 part by mass or less with respect to 100 parts by mass of the total amount of the polythiol compound and the polyisocyanate compound.

(Polymerization Catalyst)

The polymerization catalyst is preferably an organotin compound and more preferably an alkyl tin halide compound or an alkyl tin compound.

Examples of the alkyl tin halide compound include dibutyltin dichloride, dimethyltin dichloride, monomethyltin trichloride, trimethyltin chloride, tributyltin chloride, tributyltin fluoride, dimethyltin dibromide, and the like.

Examples of the alkyl tin compound include dibutyltin diacetate, dibutyltin dilaurate, and the like.

Among these, dibutyltin dichloride, dimethyltin dichloride, dibutyltin diacetate, and dibutyltin dilaurate are preferable.

The amount of the polymerization catalyst to be added is preferably 0.001 part by mass or more, more preferably 0.005 parts by mass or more, and preferably 1 part by mass or less, more preferably 0.5 parts by mass or less, and further preferably 0.1 part by mass or less with respect to 100 parts by mass of the total amount of the polythiol compound and the polyisocyanate compound.

(Release Agent)

Examples of the release agent include phosphoric acid ester compounds such as isopropyl acid phosphate, butyl acid phosphate, octyl acid phosphate, nonyl acid phosphate, decyl acid phosphate, isodecyl acid phosphate, isodecyl acid phosphate, tridecyl acid phosphate, stearyl acid phosphate, propylphenyl acid phosphate, butylphenyl acid phosphate, butoxyethyl acid phosphate, and the like. The phosphoric acid ester compound may be either a phosphoric acid monoester compound or a phosphoric acid diester compound but is preferably a mixture of a phosphoric acid monoester compound and a phosphoric acid diester compound.

The amount of the release agent to be added is preferably 0.01 part by mass or more, and more preferably 0.05 parts by mass or more, and preferably 1.00 part by mass or less, and more preferably 0.50 parts by mass or less with respect to 100 parts by mass of the total amount of the polythiol compound and the polyisocyanate compound.

[Preparation Method of Polymerizable Composition for Optical Components]

The polymerizable composition for optical components may be prepared by mixing a first composition including the polyisocyanate compound (A), a second composition including the polythiol compound (B1) and the thiol group-containing substance (B2), and optional another component mentioned above in a normal method.

The components may be mixed at once, or each may be sequentially mixed in any order. The specific mixing method is not particularly restricted, and any method known as a method for preparing the polymerization composition may be used without any limitation.

The polymerizable composition for optical components according to the present embodiment has an equivalent ratio A/B1 of 80/100 to 95/100, wherein the equivalent ratio A/B1 represents a ratio of an equivalent A of the polyisocyanate compound (A) calculated using the molecular weight and the functional group number of the polyisocyanate compound (A) to an equivalent B1 of the polythiol compound (B1) calculated using the molecular weight and the functional group number of the polythiol compound (B1). The equivalent ratio A/B1 is preferably 85/100 to 95/100, and more preferably 85/100 to 90/100.

If the equivalent ratio A/B1 of the polymerizable composition for optical components exceeds 95/100, the occurrence of striae cannot be sufficiently suppressed in optical components produced using the polymerizable composition for optical components. In contrast, if the equivalent ratio A/B1 is less than 80/100, the sufficient tensile strength required for optical components cannot be obtained.

The polymerizable composition for optical components having an equivalent ratio A/B1 within the above numerical range may be produced by preparing the first composition of a mass corresponding to the equivalent A of the polyisocyanate compound (A) and the second composition of a mass corresponding to the equivalent (B1) of the polythiol compound (B1) in a combination of the equivalent A and the equivalent B1 satisfying the above numerical range of the equivalent A/B1, and mixing these compositions.

When the polyisocyanate compound (A) and the polythiol compound (B1) are each a mixture of plural kinds of compounds, the equivalent of the mixture is calculated as a sum of values obtained by multiplying the mass proportion of each component on an equivalent of the compound. For example, in a case where the equivalents of two kinds of compounds are X and Y, respectively, and the mass proportion is 40:60, the equivalent of the mixture can be calculated as X×40/100+Y×60/100.

Note that, when a polymerizable composition for optical components containing a polyisocyanate compound and a polythiol compound is prepared, a composition including a polyisocyanate compound and a composition including a polythiol compound are generally mixed in a mass ratio such that the equivalent determined from the molecular and the functional group of the polyisocyanate compound and the equivalent determined from the molecular and the functional group of the polythiol compound will be 1:1.

However, a polymerizable composition for optical components may be prepared using a composition with slightly low content purity of the polythiol compound in some cases where a very small amount of by-products occurs in the synthetic process of the polythiol compound or a polythiol raw material with low purity is used. According to the study by the present inventors, it has been found that striae tend to occur, especially in a thick optical component such as a semi-finish lens when an optical component is produced using such a polymerizable composition for optical components. These striae occur at various positions in an optical component, and the striae-occurring portions cannot be removed by polishing or grinding the optical component in many cases. Thus, these striae may cause a lowering of the quality of the optical component or production efficiency of the optical component.

On the contrary, the polymerizable composition for optical components of the present embodiment ensures the tensile strength required for optical components and can sufficiently suppress the occurrence of the striae due to the equivalent ratio A/B1 within the above numerical range.

Although the reasons why the polymerizable composition for optical components of this embodiment is not limited, one of the reasons is that the above effect is presumed to be exhibited on the following reason. That is, the reaction product of the above thiol group-containing substance (B2) and a polyisocyanate compound may cause striae, but the reaction is slow. Thus, when the equivalent A of the polyisocyanate compound (A) is small, the reaction between the thiol group-containing substance (B2) and the polyisocyanate compound (A) is less likely to occur, and therefore the striae are also less likely to occur. Meanwhile, when the equivalent A of the polyisocyanate compound (A) is larger, the polyisocyanate compound remains by the final stage of the polymerization reaction. Thus, the reaction between the thiol group-containing substance (B2) and the polyisocyanate compound tends to occur and, and as a result, the striae tend to occur. Thus, it is presumed that the striae suppression properties and the mechanical strength can be both achieved by reducing the equivalent A of the polyisocyanate compound (A) in the second composition.

The second composition containing the polythiol compound (B1) and a thiol group-containing substance (B2) to be used may have a purity determined from the thiol value of 96.0% or less. The thiol value may be determined by the method disclosed in the Examples described below.

Using a composition with a purity of 96.0% or less reduces the limitations required for the synthetic method and raw materials of the polythiol compound (B1) and eliminates the need for advanced purifications or the like, and therefore, a remarkably high yield tends to be achieved and a second composition, as well as a polymerizable composition for optical components, can be produced more easily at a lower cost.

Although the lower limit of the purity of the second composition is not particularly restricted, it is preferably 80% or higher, more preferably 88% or higher, and further preferably 92% or higher in view of easiness for preventing coloring the optical components.

The purity of the first composition containing a polyisocyanate compound (A) is not particularly restricted, but for example, it may be 98% by mass or higher, 99% by mass or higher, 99.5% by mass or higher, or 100% by mass with respect to the total mass of the first composition.

[Optical Component]

An optical component may be obtained by polymerizing the above polymerizable composition for optical components to generate a polymerization product.

Examples of the optical components include spectacle lenses, camera lenses, prisms, optical fibers, substrates for recording media used for optical disks, magnetic disks, etc., optical filters attached to a display of a computer, and the like. Among them, a spectacle lens is preferable, and a base material for a spectacle lens is more preferable.

The polymerization conditions of the polymerizable composition for optical components may be appropriately set according to the polymerizable composition.

The polymerization initiation temperature is preferably 0° C. or more, more preferably 10° C. or more, and preferably 50° C. less, more preferably 40° C. or less. It is preferable to raise the temperature from the polymerization initiation temperature and then heat and cure to form a polymerization product. For example, the maximum raised temperature is usually 110° C. or more and 130° C. or less.

After completion of the polymerization, the spectacle lens may be released, and annealing treatment may be performed. The temperature of the annealing treatment is preferably 100° C. to 150° C.

When the optical component is a spectacle lens, the polymerization is preferably performed by a cast polymerization method. The spectacle lens can be obtained, for example, by injecting the polymerizable composition into a mold die which is a combination of a glass or metal mold and a tape or a gasket and performing polymerization.

The optical component may have a thickness part with a maximum thickness of 8.0 mm or larger. Thus, using the polymerizable composition for optical components of the present embodiment can efficiently suppress the occurrence of the striae even in the case of a thick optical component.

[Spectacle Lens]

When the optical component is prepared in the form of a spectacle lens, the optical component may be used as it is as a spectacle lens, or a cut product of the optical component may be used as a spectacle lens.

The spectacle lens may include another layer.

The surface shape of the spectacle lens is not particularly restricted and may be any of a flat surface, a convex surface, a concave surface, and the like.

The spectacle lens may be any of a single focus lens, a multifocal lens, a progressive power lens, and the like. For example, as an example, with respect to a progressive power lens, a near portion region (near portion) and a progressive portion region (intermediate region) are normally included in a lower region, and a distance portion region (distance portion) is normally included in an upper region.

The spectacle lens may be a finish spectacle lens or may be a semi-finish spectacle lens. Note that a semi-finish spectacle lens is processed by polishing or grinding into a practically usable spectacle lens and thus generally has a large thickness. However, using the polymerizable composition for optical components of an embodiment of the present invention can sufficiently suppress the occurrence of the striae even in the case of a semi-finish spectacle lens.

The thickness and diameter of the spectacle lens are not particularly restricted, and the thickness is normally 1 to 30 mm, and the diameter is normally 50 to 100 mm.

The refractive index ne of the spectacle lens is preferably 1.53 or higher, more preferably 1.55 or higher, more preferably 1.58 or higher, further preferably 1.60 or higher, further preferably 1.67 or higher, and further preferably 1.70 or higher, and preferably 1.80 or less.

A spectacle lens according to the present embodiment includes a base material made of the above-described resin composition.

The spectacle lens may further include at least one selected from the group consisting of a hard coat layer, a primer layer, an antireflection film, and a water-repellent film.

The hard coat layer is provided for improving the abrasion resistance and can be formed by applying a coating solution having a fine particulate inorganic substance such as an organosilicon compound, tin oxide, silicon oxide, zirconium oxide, titanium oxide, or the like.

The primer layer is provided for improving the impact resistance and includes, for example, polyurethane as the main component. Here, the polyurethane content is preferably 50% by mass or more in the primer layer.

Examples of the antireflection film include films obtained by laminating silicon oxide, titanium dioxide, zirconium oxide, tantalum oxide, and the like.

The water repellent film can be formed using an organosilicon compound having a fluorine atom.

With regard to the examples, content, and various physical properties of the above-described components, the matters described as exemplary or preferred ranges in the detailed description of the present disclosure may be adopted in any combination.

In addition, where the composition described in the examples is adjusted to the composition described in the detailed description of the invention, the invention can be carried out in the same manner as in the examples over the entire claimed scope of the composition.

EXAMPLES

The present disclosure will be more specifically described with reference to examples. The evaluation of striae suppression performance and the measurement of the tensile strength of optical components that were polymerization products from the polymerizable composition for optical components, the measurement of the purities of compositions containing a polythiol compound, and the high performance liquid chromatography analysis of compositions containing a polythiol compound were performed in the following procedures.

<Evaluation of Striae Suppression Performance>

A projective test was performed using Optical Modulex SX-UI251HQ (manufactured by Ushio Inc.). A high pressure UV lamp USH-102D was used as a light source, and a white screen was installed at a distance of one meter from the lamp, then the test resin was inserted between the light source and the screen, the projection image on the screen was observed, and the judgment was performed on the basis of the following standards. A to C were acceptable, and D and E were rejected.

A: No linear irregularities were observed in the projection image.
B: Very thin linear irregularities were observed in the projection image.
C: Thin linear irregularities were observed in the projection image.
D: Thick linear irregularities were observed in the projection image.
E: Remarkably thick linear irregularities were observed in the projection image.

<Measurement of Tensile Strength>

The plastic lenses (0.00 D) obtained in Examples and Comparative Examples were rounded to a diameter of 50 mm to prepare sample lenses for tensile strength measurement.

Holes each having a diameter of 1.6 mm were opened at two positions facing each other across the center at positions 21.0 mm away from the center of each sample lens to form two holes in each sample lens.

Fixing pins to fix the sample lenses to the tensile testing machine were attached to respective holes of the sample lens, the sample lens was set in the tensile tester, and the tensile strength was measured (pulling rate: 5.0 ram/min). A universal testing machine RTC-1225A, manufactured by Orientec Co., Ltd., was used as the tensile testing machine. Sample lenses showing a tensile strength of less than 73.0 $N/mm^2$ were rejected.

<Measurement of Purity of Composition Containing Polythiol Compound>

The purity (%) of a composition containing a polythiol compound (B1) and a thiol group-containing substance (B2) was determined by first determining the total thiol value of the polythiol compound (B1) and the thiol group-containing substance (B2) in the composition in a manner described below and dividing an equivalent determined from a known molecular weight and a functional group of the polythiol compound (B1) by the thiol value.

[1] 0.2 g of a measuring sample was precisely weighed.
[2] 25 ml of chloroform was added to dissolve the sample, then 25 ml of methanol was added and mixed to prepare a uniform solution.
[3] Titration was performed using a 0.05 mol/l iodine solution for titration (N/10). The point at which the solution was colored yellow was regarded as the end point.
[4] A blank measurement was performed in a similar procedure.

Thiol value=$(S \times 1000)/((C-D) \times f \times 0.1)$

S: Sample amount (g)
C: Titration amount at the end point (ml)
D: Blank amount (ml)
f: Factor of iodine solution Purity (%)=(equivalent determined from molecular weight and functional group/measured thiol value)×100

<High Performance Liquid Chromatography (HPLC) Analysis of Compound Containing Polythiol Compound>

In an HPLC system LC-30A, manufactured by Shimadzu Corporation, YMC Triart C18 (3 to 150 mm, 3 μm) column was used as a column, the column temperature was set to 50° C., and 0.1% aqueous formic acid solution (liquid A) and acetonitrile (liquid B) were used as mobile phases. Then, the gradient elution condition was set as follows, and a chromatogram was created.

(1) Flow rate: 0.3 mL/min
(2) Injection amount: 5 μL
(3) Detection wavelength: 230 nm Example 1

48.0 parts by mass of 1,3-bis(isocyanatomethyl)benzene, which was the polyisocyanate compound (A), as a first composition, 0.15 parts by mass of butoxy ethyl acid phosphate (JP-506H, manufactured by Johoku Chemical Co., Ltd.) as a release agent, 1.20 parts by mass of SEESORB 701, manufactured by Shipro Kasei Kaisha, Ltd., as an ultraviolet absorber, and dimethyl tin dichloride in an amount of 100 ppm by mass relative to the total amount of the polyisocyanate compound (A) and the polythiol compound (B1) as a catalyst were used, and these were mixed and dissolved to form a homogeneous solution.

To the solution, 52.0 parts by mass of a second composition (purity: 95.8%) containing a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol as the polythiol compounds (B1) was added and mixed to prepare a homogeneous solution. Furthermore, this solution was deaerated at 200 Pa for one hour and filtrated with a 5.0-μm PTFE (polytetrafluoroethylene) filter to obtain a polymerizable composition 1 for optical components.

A chromatogram for the second composition obtained under the above condition is illustrated in FIG. 1, and a high-strength peak P1 derived from the polythiol compound (B1) appears at a retention time of around 26 minutes. In addition, a peak P2 derived from the thiol group-containing substance (B2) appears at a retention time around 31 minutes and 15 seconds. The thiol group-containing substance (B2) showing the peak P2 is presumed to have a structure in which a plurality of any compounds in the polythiol compound (B1) are coupled.

The obtained polymerizable composition 1 for optical components was injected into a mold die for semi-finish lenses (center thickness: 14 mm; edge thickness: 19 mm) including an upper mold having a diameter of 75 mm and a curvature radius of 68 mm, a lower mold having a curvature radius of 55 mm, and a tape pasted on the side surfaces of both.

The obtained polymerizable composition 1 for optical components was injected into a mold die for 0.00 D finish lenses (center thickness: 2 mm; edge thickness: 2 mm) including an upper mold having a diameter of 75 mm and a curvature radius of 112 mm, a lower mold having a curvature radius of 112 mm, and a tape pasted on the side surfaces of both.

The above mold dies into which the polymerizable composition for optical components were each put in an electric furnace. The temperature of the mold die for 0.00 D finish lenses was raised from 20° C. to 120° C. over 20 hours, and the polymerizable composition 1 for optical components was polymerized for further three hours at 120° C. The temperature of the mold die for semi-finish lenses was raised from 15° C. to 120° C. over 40 hours, and the polymerizable composition for optical components was polymerized for further three hours at 120° C. After completing the polymerization, the mold dies were taken out of the electric furnace, and the content was released from the mold dies, thereby obtaining an unannealed semi-finish lens and an unannealed 0.00 D finish lens.

The obtained lenses were annealed for two hours at 120° C., thereby obtaining a semi-finish lens with a maximum thickness of 19 mm and a final product of a 0.00 D finish lens with a maximum thickness of 2 mm.

Example 2

A semi-finish lens and a 0.00 D finish lens having similar maximum thicknesses to those of Example 1 were prepared in a similar manner to Example 1, except that the used amount of the first composition was changed to 45.0 parts by mass and the used amount of the second composition was changed to 55.0 parts by mass.

Example 3

A semi-finish lens and a 0.00 D finish lens having similar maximum thicknesses to those of Example 1 were prepared in a similar manner to Example 1, except that the used amount of the first composition was changed to 49.4 parts by mass and the used amount of the second composition was changed to 50.6 parts by mass.

Example 4

A semi-finish lens and a 0.00 D finish lens with similar maximum thicknesses to those of Example 1 were prepared in a similar manner to Example 1, except that 45.0 parts by mass of 1,3-(bisisocyanatomethyl) cyclohexane, which was the polyisocyanate compound (A), was used as the first composition, a second composition containing a mixture of 25.0 parts by mass of pentaerythritol tetrakis(2-mercaptoacetate) (purity: 93.2%) and 30.0 parts by mass of 2,5-bis(mercaptomethyl)-1,4-dithiane (purity: 95.5%) as the polythiol compounds (B1) was used, and dimethyl tin dichloride in an amount of 0.5 parts by mass relative to the total amount of the polyisocyanate compound and the polythiol compound was used as a catalyst.

Example 5

A semi-finish lens and a 0.00 D finish lens with similar maximum thicknesses to those of Example 1 were prepared in a similar manner to Example 1, except that 48.1 parts by mass of a mixture of 2,5-bis(isocyanatomethyl)-bicyclo [2.2.1]heptane and 2,6-bis(isocyanatomethyl)-bicyclo [2.2.1]heptane, which were the polyisocyanate compounds (A), was used as the first composition, a second composition containing a mixture of 24.0 parts by mass of pentaerythritol tetrakis(3-mercaptopropionate) (purity: 94.2%) and 27.9 parts by mass of 4-mercaptomethyl-1,8-dimercapto-3,6-dithiaoctane (purity: 95.0%) as the polythiol compounds (B1) was used, and dimethyl tin dichloride in an amount of 0.05 parts by mass relative to the total amount of the polyisocyanate compound (A) and the polythiol compound (B1) was used as a catalyst.

Comparative Example 1

A semi-finish lens and a 0.00 D finish lens with similar maximum thicknesses to those of Example 1 were prepared in a similar manner to Example 1, except that the used amount of the first composition was changed to 50.6 parts by mass and the used amount of the second composition was changed to 49.4 parts by mass.

Comparative Example 2

A semi-finish lens and a 0.00 D finish lens with similar maximum thicknesses to those of Example 1 were prepared in a similar manner to Example 1, except that the used amount of the first composition was changed to 50.2 parts by mass and the used amount of the second composition was changed to 49.8 parts by mass.

Comparative Example 3

A semi-finish lens and a 0.00 D finish lens having similar maximum thicknesses to those of Example 1 were prepared in a similar manner to Example 1, except that the used amount of the first composition was changed to 44.5 parts by mass and the used amount of the second composition was changed to 55.5 parts by mass.

Comparative Example 4

A semi-finish lens and a 0.00 D finish lens with similar maximum thicknesses to those of Example 1 were prepared in a similar manner to Example 4, except that the used amount of the first composition was changed to 47.6 parts by mass and a second composition containing a mixture of 23.8 parts by mass of pentaerythritol tetrakis(2-mercaptoacetate) (purity: 93.2%) and 28.6 parts by mass of 2,5-bis(mercaptomethyl)-1,4-dithiane (purity: 95.5%) as the polythiol compounds (B1) was used.

Comparative Example 5

A semi-finish lens and a 0.00 D finish lens with similar maximum thicknesses to those of Example 1 were prepared in a similar manner to Example 5, except that the used amount of the first composition was changed to 50.7 parts by mass and a second composition containing a mixture of 22.8 parts by mass of pentaerythritol tetrakis(3-mercaptopropionate) (purity: 94.2%) and 26.5 parts by mass of 4-mercaptomethyl-1,8-dimercapto-3,6-dithiaoctane (purity: 95.0%) as the polythiol compounds (B1) was used.

The results are shown in Table 1.

TABLE 1

| | Polymerizable composition for optical components | | | | | Evaluation | |
|---|---|---|---|---|---|---|---|
| | Polyisocyanate compound | Polythiol compound | Purity of Polythiol compound [%] | Equivalent ratio | | Striae suppression ability | Tensile strength [N/mm$^2$] |
| | | | | R-NCO | R-SH | | |
| Example 1 | I-1 | T-4 | 95.8 | 90 | 100 | A | 79.3 |
| Example 2 | I-1 | T-4 | 95.8 | 80 | 100 | A | 76.4 |
| Example 3 | I-1 | T-4 | 95.8 | 95 | 100 | C | 80.2 |

TABLE 1-continued

Polymerizable composition for optical components

| | Polyisocyanate compound | Polythiol compound | Purity of Polythiol compound [%] | Equivalent ratio R-NCO | Equivalent ratio R-SH | Evaluation Striae suppression ability | Evaluation Tensile strength [N/mm$^2$] |
|---|---|---|---|---|---|---|---|
| Example 4 | I-3 | T-1 + T-2 | 95.5, 93.2 | 90 | 100 | A | 84.5 |
| Example 5 | I-2 | T-3 + T-5 | 95.0, 94.2 | 90 | 100 | A | 78.0 |
| Comparative Example 1 | I-1 | T-4 | 95.8 | 100 | 100 | E | 79.0 |
| Comparative Example 2 | I-1 | T-4 | 95.8 | 98 | 100 | D | 79.7 |
| Comparative Example 3 | I-1 | T-4 | 95.8 | 78 | 100 | A | 72.1 |
| Comparative Example 4 | I-3 | T-1 + T-2 | 95.5, 93.2 | 100 | 100 | D | 85.1 |
| Comparative Example 5 | I-2 | T-3 + T-5 | 95.0, 94.2 | 100 | 100 | D | 78.4 |

\* The abbreviations in Table 1 are as follows.
R-NCO: A polyisocyanate compound is represented.
R-SH: A polythiol compound(s) is/are represented.
I-1: 1,3-Bis(isocyanatomethyl)benzene
I-2: Mixture of 2,5-bis(isocyanatomethyl)-bicyclo[2.2.1]heptane and 2,6-bis(isocyanatomethyl)bicyclo[2.2.1]heptane.
I-3: 1,3-Bis(isocyanatomethyl)cyclohexane
T-1: 2,5-Bis(mercaptomethyl)-1,4-dithiane
T-2: Pentaerythritol tetrakis(2-mercaptoacetate)
T-3: 4-Mercaptomethyl-1,8-dimercapto-3,6-dithiaoctane
T-4: Mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol
T-5: Pentaerythritol tetrakis(3-mercaptopropionate)

As is apparent from Table 1, when optical components were prepared using polymerizable compositions for optical components of Examples 1 to 5, having equivalent ratios A/B1 within the range from 80/100 to 95/100, it is found that the occurrence of the striae was suppressed, and the tensile strength was kept well even in the case of semi-finish lenses. Particularly, when polymerizable compositions for optical components of Examples 1, 2, 4, and 5, having equivalent ratios A/B1 within the range from 80/100 to 90/100 were used, it is found that the occurrence of the striae was more efficiently suppressed.

Meanwhile, it is found that, when the polymerizable compositions for optical components in Comparative Examples 1 to 5, having equivalent ratios A/B1 out of the range from 80/100 to 90/100 were used, the occurrence of striae may be significant in a resultant optical component or the tensile strength may be too low, which could not achieve both characteristics.

Finally, the embodiments of the present disclosure are summarized as follows.

The polymerizable composition for optical components of an embodiment of the present disclosure is a mixture of a first composition including a polyisocyanate compound (A) and a second composition including a polythiol compound (B1) and a thiol group-containing substance (B2), the polymerizable composition further includes the thiol group-containing substance (B2) showing a peak at a position corresponding to a retention time three minutes or more later from the position of a peak of the polythiol compound (B1) in a chromatogram obtained by analyzing the second composition by high performance liquid chromatography (HPLC) analysis under the following condition, and the equivalent ratio (A/B1) is 80/100 to 95/100, wherein the equivalent ratio (A/B1) represents a ratio of an equivalent A of the polyisocyanate compound (A) calculated using the molecular weight and the functional group number of the polyisocyanate compound (A) to an equivalent B1 of the polythiol compound (B1) calculated using the molecular weight and the functional group number of the polythiol compound (B1).

HPLC system: LC-30A, manufactured by Shimadzu Corporation

Column: YMC Triart C18 (3 to 150 mm, 3 μm)

Column temperature: 50° C.

Mobile phase: 0.1% aqueous formic acid solution (liquid A), acetonitrile (liquid B)

Gradient elution condition (1) Flow rate: 0.3 mL/min (2) Injection amount: 5 μL (3) Detection wavelength: 230 nm According to the above embodiment, a polymerizable composition for optical components capable of preventing the occurrence of striae while keeping the required strength for optical components even when a thick optical component such as a semi-finish spectacle lens is produced can be provided.

The embodiments disclosed herein are to be understood as examples and do not restrict the scope of the invention in the entire points. The scope of the invention is determined not by the above description but by the claims and is intended to include the interpretations that are equivalent to the claims and all modifications within the scope of claims.

In the present disclosure, with regard to the examples, content, and various physical properties of the above-described components, the matters described as exemplary or preferred ranges in the detailed description of the invention may be adopted in any combination.

In addition, where the composition described in the examples is adjusted to the composition described in the detailed description of the invention, the embodiments relating to the disclosure can be carried out in the same manner as in the examples over the entire scope of the claimed composition.

REFERENCE SIGNS LIST

P1 Peak derived from polythiol compound (B1)
P2 Peak derived from thiol group-containing substance (B2)

The invention claimed is:

1. A polymerizable composition for optical components, comprising a polyisocyanate compound (A) and a polythiol compound (B1), the polymerizable composition for optical components being a mixture of a first composition including the polyisocyanate compound (A) and a second composition including the polythiol compound (B1) and a thiol group-containing substance (B2), the polymerizable composition further comprising the thiol group-containing substance (B2) showing a peak at a position corresponding to a retention time three minutes or more later from a position of a peak of the polythiol compound (B1) in a chromatogram obtained by analyzing the second composition by high performance liquid chromatography (HPLC) analysis under the following condition, and the polymerizable composition having an equivalent ratio (A/B1) of 80/100 to 95/100, wherein the equivalent ratio (A/B1) represents a ratio of an equivalent A of the polyisocyanate compound (A) calculated using a molecule weight and a functional group number of the polyisocyanate compound (A) to an equivalent B1 of the polythiol compound (B1) calculated using a molecule weight and a functional group number of the polythiol compound (B1):

HPLC system: LC-30A, manufactured by Shimadzu Corporation
column: YMC Triart C18 (3 to 150 mm, 3 μm)
column temperature: 50° C.
mobile phase: 0.1% aqueous formic acid solution (liquid A), acetonitrile (liquid B)
gradient elution condition
(1) flow rate: 0.3 mL/min
(2) injection amount: 5 μL
(3) detection wavelength: 230 nm.

2. The polymerizable composition for optical components according to claim 1, wherein the polythiol compound (B1) includes a polythiol compound having two or more sulfide bonds and two or more mercapto groups.

3. The polymerizable composition for optical components according to claim 1, wherein the polythiol compound (B1) includes a polythiol compound having two or more sulfide bonds and three or more mercapto groups.

4. The polymerizable composition for optical components according to claim 1, wherein the polythiol compound (B1) is a mixture of polythiol compounds selected from the group consisting of
  [1] a mixture of 2,5-bis(mercaptomethyl)-1,4-dithiane and pentaerythritol tetrakis(2-mercapto acetate),
  [2] a mixture of 4-mercaptomethyl-1,8-dimercapto-3,6-dithiaoctane and pentaerythritol tetrakis(3-mercaptopropionate), and
  [3] a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

5. The polymerizable composition for optical components according to claim 1, wherein the thiol group-containing substance (B2) shows a peak at a position corresponding to a retention time from 31 to 32 minutes.

6. The polymerizable composition for optical components according to claim 1, wherein thiol group-containing substance (B2) includes a polythiol compound having a structure in which a plurality of polythiol compounds (B1) are coupled.

7. The polymerizable composition for optical components according to claim 1, wherein the second composition has a purity determined based on a thiol value of 96.0% or less.

8. An optical component comprising the polymerizable composition for optical components according to claim 1.

9. The optical component according to claim 8, having a thickest part with a maximum thickness of 8.0 mm or larger.

10. A spectacle lens comprising the optical component according to claim 9.

11. A spectacle lens comprising a cut product from the optical component according to claim 9.

* * * * *